US012159599B2

(12) United States Patent
Hai

(10) Patent No.: US 12,159,599 B2
(45) Date of Patent: Dec. 3, 2024

(54) METHOD OF ADJUSTING DISPLAY SCREEN, ADJUSTING DEVICE FOR DISPLAY SCREEN, DISPLAY DEVICE, AND STORAGE MEDIUM

(71) Applicant: Shenzhen China Star Optoelectronics Semiconductor Display Technology Co., Ltd., Guangdong (CN)

(72) Inventor: Bo Hai, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,468

(22) PCT Filed: May 18, 2022

(86) PCT No.: PCT/CN2022/093468
§ 371 (c)(1),
(2) Date: May 25, 2022

(87) PCT Pub. No.: WO2023/201812
PCT Pub. Date: Oct. 26, 2023

(65) Prior Publication Data
US 2024/0169945 A1 May 23, 2024

(30) Foreign Application Priority Data
Apr. 18, 2022 (CN) ......................... 202210406285.3

(51) Int. Cl.
*G09G 3/36* (2006.01)
*G09G 3/20* (2006.01)

(52) U.S. Cl.
CPC ......... *G09G 3/3607* (2013.01); *G09G 3/2074* (2013.01); *G09G 2320/0233* (2013.01);
(Continued)

(58) Field of Classification Search
CPC ............... G09G 3/3607; G09G 3/2074; G09G 2320/0233; G09G 2320/0242;
(Continued)

(56) References Cited

U.S. PATENT DOCUMENTS

| | | | | |
|---|---|---|---|---|
| 2016/0078823 | A1* | 3/2016 | Chang .................. | G09G 3/3413 345/173 |
| 2018/0233107 | A1* | 8/2018 | Wu ...................... | G09G 3/3607 |
| 2020/0301199 | A1* | 9/2020 | Ma ....................... | G02B 5/3033 |

FOREIGN PATENT DOCUMENTS

| | | |
|---|---|---|
| CN | 106444141 A | 2/2017 |
| CN | 206773335 U | 12/2017 |

(Continued)

OTHER PUBLICATIONS

International Search Report in International application No. PCT/CN2022/093468, mailed on Dec. 19, 2022.

(Continued)

*Primary Examiner* — Kenneth B Lee, Jr.

(57) ABSTRACT

A method of adjusting a display screen, an adjusting device for a display screen, a display device, and a storage medium are provided. The method includes obtaining brightness information in an abnormal brightness area in response to detecting that the abnormal brightness area is in a current display screen, obtaining a corresponding transmittance cut-off wavelength sequence in an abnormal color area in the abnormal brightness area in response to determining that the abnormal color in the abnormal brightness area is blue, and eliminating the abnormal color area in the display screen by absorbing wavelength energy whose wavelength is less than a predetermined wavelength threshold in the transmittance cut-off wavelength sequence.

11 Claims, 7 Drawing Sheets

(52) U.S. Cl.
CPC ............... *G09G 2320/0242* (2013.01); *G09G 2320/0666* (2013.01); *G09G 2320/0686* (2013.01); *G09G 2320/0693* (2013.01)

(58) Field of Classification Search
CPC ... G09G 2320/0666; G09G 2320/0686; G09G 2320/0693
See application file for complete search history.

(56) References Cited

FOREIGN PATENT DOCUMENTS

| | | | |
|---|---|---|---|
| CN | 108646456 | A | 10/2018 |
| CN | 109343164 | A | 2/2019 |
| CN | 112002288 | A | 11/2020 |
| CN | 113087716 | A | 7/2021 |
| CN | 113093428 | A | 7/2021 |
| CN | 215219370 | U | 12/2021 |
| EP | 2224280 | A2 | 9/2010 |
| EP | 2743909 | A1 | 6/2014 |
| JP | 2001112013 | A | 4/2001 |
| JP | 2012084512 | A | 4/2012 |
| KR | 20130113808 | A | 10/2013 |

OTHER PUBLICATIONS

Written Opinion of the International Search Authority in International application No. PCT/CN2022/093468, mailed on Dec. 19, 2022.

Chinese Office Action issued in corresponding Chinese Patent Application No. 202210406285.3 dated Jan. 19, 2023, pp. 1-8.

* cited by examiner

METHOD OF ADJUSTING DISPLAY SCREEN, ADJUSTING DEVICE FOR DISPLAY SCREEN, DISPLAY DEVICE, AND STORAGE MEDIUM

BACKGROUND OF INVENTION

1. Field of Invention

The present application relates to a technical field of radio frequency, and particularly, to a method of adjusting a display screen, an adjusting device for a display screen, a display device, and a storage medium.

2. Related Art

In a technical field of displays, flat panel display devices, such as liquid crystal displays (LCDs) and organic light-emitting diode (OLED) displays have gradually replaced cathode ray tube (CRT) display devices. LCDs have many advantages, such as being compact, power saving, and no radiation, and have been widely used. In actual applications, in processes of importing liquid crystal panels into customer verification processes, the phenomenon that color points of white image level are bluish often occurs.

Currently, in response to the above-mentioned problem, blue grayscale voltages of liquid crystal panels are mainly reduced to reduce a proportion of blue light to make color points yellow. However, the more the blue grayscale voltages are reduced, the more the transmittance will be reduced. Therefore, how to reduce the proportion of blue light while ensuring the transmittance has become an urgent problem to be solved.

SUMMARY OF INVENTION

Accordingly, it is imperative to provide a method, an adjusting device, a display device, and a storage medium for adjusting a display screen in response to the above-mentioned technical problems.

A method of adjusting a display screen, applied to a display device, the method including: detecting whether an abnormal brightness area is in a current display screen; obtaining, in response to detecting that the abnormal brightness area is in the current display screen, brightness information in the abnormal brightness area; determining whether an abnormal color in the abnormal brightness area is blue according to the brightness information; obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen.

An adjusting device for a display screen, includes: a detection module configured to detect whether an abnormal brightness area is in a current display screen; a first acquisition module configure to obtain, in response to detecting that the abnormal brightness area is in the current display screen, brightness information in the abnormal brightness area; a determination module configured to determine whether an abnormal color in the abnormal brightness area is blue according to the brightness information; a second acquisition module configured to obtain, in response to determining that the abnormal color in the abnormal brightness area is blue, a corresponding transmittance cut-off wavelength sequence in an abnormal color area in the abnormal brightness area; and an absorbing module configured to absorb wavelength energy whose wavelength is less than a predetermined wavelength threshold in the transmittance cut-off wavelength sequence, so that the abnormal color area in the display screen is eliminated.

A display device includes a memory and a processor, and the memory stores a computer program. The processor implements the following steps when executing the computer program: detecting whether an abnormal brightness area is in a current display screen; obtaining, in response to detecting that the abnormal brightness area is in the current display screen, brightness information in the abnormal brightness area; determining whether an abnormal color in the abnormal brightness area is blue according to the brightness information; obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen.

A computer-readable storage medium stores a computer program. The computer program stored in the computer-readable storage medium implements the following steps when being executed by the processor: detecting whether an abnormal brightness area is in a current display screen; obtaining, in response to detecting that the abnormal brightness area is in the current display screen, brightness information in the abnormal brightness area; determining whether an abnormal color in the abnormal brightness area is blue according to the brightness information; obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen.

The present application has advantageous effects as follows: the method of adjusting the display screen is applied to the display device and is implemented to detect whether an abnormal brightness area is in a current display screen, obtain brightness information in the abnormal brightness area in response to detecting that the abnormal brightness area is in the current display screen, determine whether an abnormal color in the abnormal brightness area is blue according to the brightness information, obtain a corresponding transmittance cut-off wavelength sequence in an abnormal color area in the abnormal brightness area in response to determining that the abnormal color in the abnormal brightness area is blue, and eliminate the abnormal color area in the display screen by absorbing wavelength energy whose wavelength is less than a predetermined wavelength threshold in the transmittance cut-off wavelength sequence. By means of absorbing the light energy in the wavelength range whose wavelength is less than the predetermined wavelength threshold in the transmittance cut-off wavelength sequence, the chromaticity information (for example, a first chromaticity Wx and a second chromaticity Wy) can be increased, thereby reducing a proportion of blue light, so as to achieve a purpose of eliminating the abnormal color area in the display screen.

BRIEF DESCRIPTION OF DRAWINGS

In order to better illustrate the technical solutions in the embodiments of the present application or in the prior art, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

In order to make the objectives, technical solutions and advantages of the present application clearer, the present application will be further described in detail below with reference to the accompanying drawings and embodiments. It should be understood that the specific embodiments described herein are only used to explain the present application, but not to limit the present application.

Figure 1:
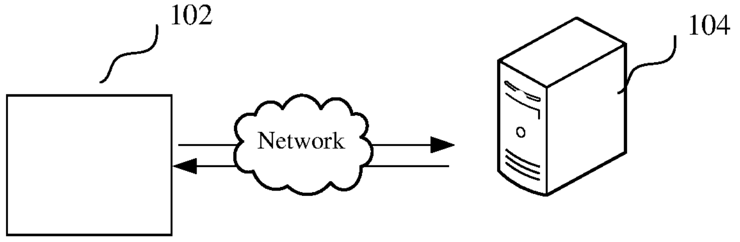
FIG. 1 is an application environment diagram of a method for adjusting a display screen in an embodiment of the present application.

A method of adjusting a display screen applied to a radio frequency power supply provided by the present application can be applied to an application environment shown in FIG. 1. Specifically, a display device 102 communicates with a server 104 through a network to solve a problem that a proportion of blue light cannot be reduced while ensuring the transmittance. Specifically, the display device 102 may be implemented by an independent display device or a combination of display devices composed of multiple display devices. Specifically, the display device 104 may include a liquid crystal panel; the liquid crystal panel may be, but is not limited to, a twisted nematic (TN) panel, a vertical alignment (VA) panel, an in-plane switching (IPS) panel, and a continuous pinwheel alignment (CPA) panel. The server 104 can be implemented by an independent server or a server cluster composed of multiple servers.

Figure 2:
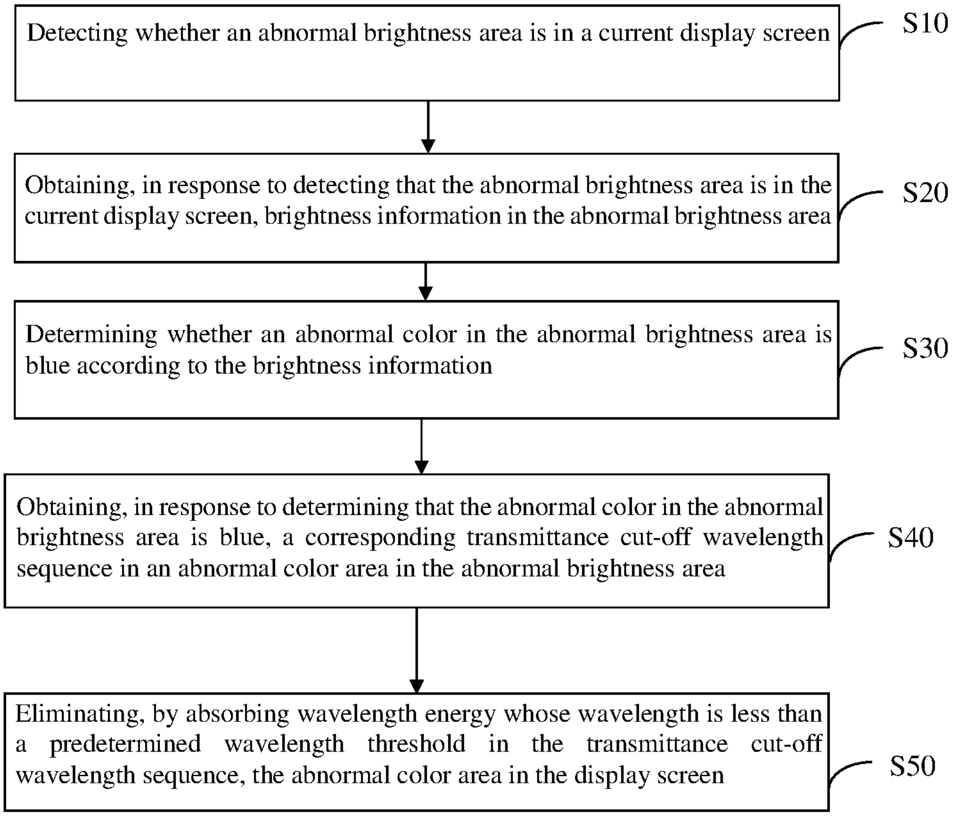
FIG. 2 is a flowchart of a method of adjusting a display screen in an embodiment of the present application.

In one embodiment, as shown in FIG. 2, a method of adjusting a display screen applied to a display device is provided, and the method is applied to the display device 102 in FIG. 1 as an example for description. As shown in FIG. 2, the method of adjusting the display screen applied to the display device specifically includes following steps:

Step S10: detecting whether an abnormal brightness area is in a current display screen.

Specifically, the display screen may include various types, for example, it may display a still image, or may display a dynamic video, and so on. The screen can be displayed according to display instructions by receiving user's display instructions. The display device can be a television, and the user can trigger the display instructions in various ways. For example, the user can manipulate physical keys of the display device, touch the display screen, or trigger the display device to start displaying a picture through operation of other remote control devices. A current display screen can be a video frame image during a video playback process, and the video frame image may be a video frame image with abnormal image brightness. The abnormal image brightness may be referred to as a brightness difference existing in a display area displaying a same color in a same video picture. The video frame image can be obtained through many ways, for example, a program command can be input, and a video frame image can be obtained through the program command as the current display screen. For example, users perform video playback through the display device. When brightness of a video screen is abnormal, the video playback can be paused, and a current video frame image can be intercepted by inputting program instructions as the current display screen.

After obtaining the current display screen, further, obtain brightness information of the currently display screen in multiple color channels, wherein the color channels may include a red channel, a green channel, and a blue channel.

In display fields, different ratios of the three primary colors of red (R), green (G), and blue (B) can match various light colors in visible light. The median wavelengths of the three primary colors of red (R), green (G), and blue (B) are 655 nm, 555 nm, and 455 nm, respectively. That is, a wavelength range corresponding to red (R) is about 602 nanometers (nm)-780 nm, a wavelength range corresponding to green (G) is about 501 nm-601 nm, and a wavelength range corresponding to blue (B) is about 380 nm-500 nm. Since a wavelength of common visible light is generally 380 nm-780 nm, blue belongs to a short wavelength of common visible light, green belongs to an intermediate wavelength of common visible light, and red belongs to a long wavelength of common visible light.

In one specific embodiment, the step of detecting whether an abnormal brightness area is in the current display screen can be implemented by comparing the current display screen with a target screen to obtain abnormal brightness areas in a display screen. A color difference or brightness difference between the abnormal brightness area in the display screen and a corresponding reference area in the target screen exceeds a predetermined deviation range, wherein the target screen is a screen that is completely clear without abnormality. Alternatively, a spectrum detector can be used to directly detect whether an abnormal brightness area is in the current display screen.

Step S20: obtaining, in response to detecting that the abnormal brightness area is in the current display screen, brightness information in the abnormal brightness area.

Obtain the brightness information in the abnormal brightness area in response to detecting that the abnormal brightness area is in the current display screen according to step S10. Specifically, the brightness information includes brightness information of different color channels. By obtaining the brightness information of each color channel in the abnormal brightness area, it can be determined which color channel in the abnormal brightness area is abnormal.

Specifically, each color channel stores information about color elements in the display. Colors in all color channels are overlaid and mixed to produce colors of pixels in the display screen. For example, taking an image in RGB mode as an example, a color channel principle is: a basic unit of an image is based on RGB. For this reason, it can be understood that an image is composed of three elements such as RGB, wherein R is a red channel, denoted by 1, G is a green channel, denoted by 2, and B is a blue channel, denoted by 3. If there is a white image in an image that is denoted by 4, it is a mixture of colors of channels 1, 2, and 3. This is equivalent to use a palette to create a new color by mixing several colors together.

Specifically, the brightness information of the color channel may include a brightness value of the color channel at each gray level. Grayscale divides brightness change between a brightest and a darkest image into several parts. In this way, it facilitates screen brightness control corresponding to signal input. Each digital image is composed of many points, which are also called pixels. Generally, each pixel can present many different colors and is composed of three sub-pixels of red, green, and blue (RGB). For each sub-pixel, a light source behind it can exhibit a different brightness level. Grayscales represent different levels of brightness from the darkest to the brightest. The more intermediate layers there are, the more delicate the picture effect that can be presented. Each pixel in the display screen is composed of red, green, and blue with different brightness levels, and finally forms different color points. That is, the color change of each point in the display screen is actually caused by grayscale changes of the three RGB sub-pixels that constitute this point.

Step S30: determining whether an abnormal color in the abnormal brightness area is blue according to the brightness information.

In some embodiments, the brightness information may include a brightness curve, and the brightness curve may be used to represent changes of brightness values with changes of grayscale values. Therefore, after obtaining the brightness information of the multiple color channels in the abnormal brightness area, a target color channel can be determined based on the brightness information of each color channel, so as to determine whether the abnormal color in the abnormal brightness area is blue. Specifically, by obtaining a brightness curve of each color channel, a brightness value difference corresponding to each adjacent two grayscales in each of the color channels through the brightness curve of each color channel can be obtained. When the brightness value difference is not within a predetermined difference range, it is determined that the color channel corresponding to the brightness value difference is the target color channel, that is, the target color channel represents an abnormal color in the abnormal brightness area.

Step S40: obtaining, in response to determining that the abnormal color in the abnormal brightness area is blue, a corresponding transmittance cut-off wavelength sequence in an abnormal color area in the abnormal brightness area.

If it is determined according to step S30 that the abnormal color in the abnormal brightness area is blue, that is, the 255-level color points appear bluish in the abnormal brightness area of the current display screen, then, the transmittance cut-off wavelength sequence corresponding to the abnormal color area is obtained. Specifically, the transmittance cut-off wavelength sequence is a sequence composed of several transmittance cut-off wavelengths. The transmittance cut-off wavelength is a cut-off wavelength that can be seen by humans through the display screen. 截止波长。Since a certain mode no longer exists when a wavelength is greater than a certain value, the wavelength is called the cut-off wavelength of this mode. In this embodiment, the transmittance cut-off wavelength sequence includes a sequence consisting of a wavelength range of 380 nm to 780 nm, that is, every wavelength in visible light is maintained.

Step S50: eliminating, by absorbing wavelength energy whose wavelength is less than a predetermined wavelength threshold in the transmittance cut-off wavelength sequence, the abnormal color area in the display screen.

Specifically, the predetermined wavelength threshold is a wavelength threshold obtained in advance according to actual tests or calculations. In this embodiment, by using the common spectrum of Cell along with the industry-uniform D65 light source having different wavelengths being absorbed, the influence of the wavelengths after being absorbed on the chromaticity information (for example: a first chromaticity Wx and a second chromaticity Wy) of the display screen is obtained, so that a relationship between an improvement degree of the chromaticity information (for example: the first chromaticity Wx and the second chromaticity Wy) and a transmittance cut-off wavelength is obtained, and then the predetermined wavelength threshold is obtained.

Specifically, absorbing the wavelength energy whose wavelength is less than the predetermined wavelength threshold in the transmittance cut-off wavelength sequence refers to absorbing light energy of a wavelength band whose wavelength is less than the predetermined wavelength threshold in the transmittance cut-off wavelength sequence, so that it cannot pass through a liquid crystal panel and fails to be displayed on the display screen.

In one embodiment, Since blue is a short wavelength in common visible light, the wavelength range corresponding to blue (B) is about 400 nm-500 nm, and a median wavelength of blue (B) is 455 nm. In addition, according to visual function characteristics of human eyes, the human eyes are most sensitive to 555 nm light, corresponding to the highest perceived brightness, but not sensitive to short wavelengths. Therefore, the predetermined wavelength threshold in this embodiment is 455 nm. It can be understood that in the present application by means of absorbing the light energy in the wavelength range whose wavelength is less than the predetermined wavelength threshold in the transmittance cut-off wavelength sequence, the chromaticity information (for example, the first chromaticity Wx and the second chromaticity Wy) can be increased, the chromaticity is shifted to yellow, and the abnormal color area in the display screen can be eliminated.

In this embodiment, the method includes detecting whether an abnormal brightness area is in a current display screen; obtaining, in response to detecting that the abnormal brightness area is in the current display screen, brightness information in the abnormal brightness area; determining whether an abnormal color in the abnormal brightness area is blue according to the brightness information; obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen. By means of absorbing the light energy in the wavelength range whose wavelength is less than the predetermined wavelength threshold in the transmittance cut-off wavelength sequence, the chromaticity information (for example, the first chromaticity Wx and the second chromaticity Wy) can be increased, thereby reducing a proportion of blue light, so as to achieve a purpose of eliminating the abnormal color area in the display screen.

Figure 3:
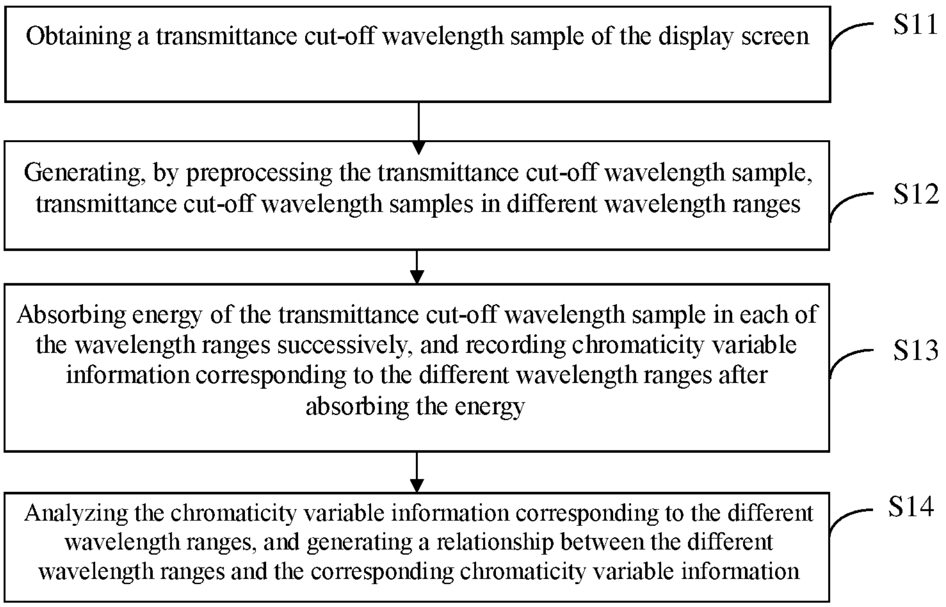
FIG. 3 is a flowchart of a method of adjusting a display screen in an embodiment of the present application.

In one embodiment, referring to FIG. 3, prior to absorbing the wavelength energy whose wavelength is less than the predetermined wavelength threshold in the transmittance cut-off wavelength information, the method of adjusting the display screen further includes:

Step S11: obtaining a transmittance cut-off wavelength sample of the display screen.

Specifically, the transmittance cut-off wavelength sample is a pre-acquired wavelength sample used for simulation calculation. In one embodiment, the transmittance cut-off wavelength sample may be a sample with a wavelength of 200 nm to 800 nm, or a sample with a wavelength of 500 nm to 1000 nm. It can be understood that the more the obtained transmittance cut-off wavelength samples are, the more accurate subsequent simulation calculation results are, but corresponding simulation calculation efficiency will be correspondingly reduced. In this embodiment, since the wavelength range of visible light is from 380 nm to 780 nm, a wavelength range of the transmittance cut-off wavelength sample in this embodiment is 380 nm to 780 nm, that is, it includes every wavelength of visible light.

Step S12: generating, by preprocessing the transmittance cut-off wavelength sample, transmittance cut-off wavelength samples in different wavelength ranges.

Specifically, the preprocessing of the transmittance cut-off wavelength sample is to perform interval processing on the obtained transmittance cut-off wavelength sample, so as to determine which wavelength interval energy has a greatest impact on chromaticity information (for example: the first chromaticity Wx and the second chromaticity Wy).

Preferably, in this embodiment, the transmittance cut-off wavelength sample is divided into three different wavelength ranges, namely a short wavelength range, a middle wavelength range, and a long wavelength range. A principle of preprocessing is to take a wavelength range corresponding to each of the red, green, and blue pigment points as a dividing point. That is to say, the transmittance cut-off wavelength sample in the range of 380 nm to 780 nm is divided into the short wavelength range of 380 nm-500 nm, which corresponds to the wavelength range of blue (B), the middle wavelength range of 501 nm to 601 nm, which corresponds to the wavelength range of green (G), and the long wavelength range of 602 nm to 780 nm, which corresponds to the wavelength range of red (R).

Step S13: absorbing energy of the transmittance cut-off wavelength sample in each of the wavelength ranges successively, and recording chromaticity variable information corresponding to the different wavelength ranges after absorbing the energy.

Specifically, after dividing the transmittance cut-off wavelength sample into the different wavelength ranges, the energy of the transmittance cut-off wavelength sample in each of the wavelength ranges is absorbed successively, and the chromaticity variable information corresponding to the different wavelength ranges after absorbing the energy is recorded. The chrominance variable information is an amount of the chrominance information (for example, the first chromaticity Wx and the second chromaticity Wy).

Exemplarily, the energy corresponding to the transmittance cut-off wavelengths in the wavelength range of 380 nm to 500 nm is first absorbed in turn from the transmittance cut-off wavelength of 380 nm, which is set to 0, then to the transmittance cut-off wavelength of 500 nm (that is, all the energy in the wavelength range 380 nm to 500 nm is set to 0). Then, the energy corresponding to the transmittance cut-off wavelengths in the wavelength range of 501 nm to 601 nm is absorbed in turn from the transmittance cut-off wavelength of 501 nm, which is set to 0, then to the transmittance cut-off wavelength of 601 nm (that is, all the energy in the wavelength range of 501 nm to 601 nm is set to 0). Finally, the energy corresponding to the transmittance cut-off wavelengths in the wavelength range of 602 nm to 780 nm is absorbed in turn from the transmittance cut-off wavelength of 602 nm, which is set to 0, then to the transmittance cut-off wavelength of 780 nm (that is, all the energy in the wavelength range of 602 nm to 780 nm is set to 0). In this way, chromaticity variable information corresponding to the transmittance cut-off wavelength sample in each of the wavelength ranges is obtained after the energy is absorbed.

Specifically, the following Table 1-1 shows the corresponding chromaticity variable information and transmittance changes after the energy with the transmittance cutoff wavelength of 400 nm to 450 nm is absorbed.

TABLE 1-1

| Transmittance cut-off wavelength (Unit: nm) | W*x* increase | W*y* increase | Cut-off wavelength decreases in transmittance |
|---|---|---|---|
| 400 | 0.0002 | 0.0005 | −0.002% |
| 401 | 0.0002 | 0.0005 | −0.002% |
| 402 | 0.0002 | 0.0006 | −0.002% |
| 403 | 0.0002 | 0.0006 | −0.002% |
| 404 | 0.0002 | 0.0007 | −0.003% |
| 405 | 0.0003 | 0.0008 | −0.003% |
| 406 | 0.0003 | 0.0008 | −0.003% |
| 407 | 0.0003 | 0.0009 | −0.003% |
| 408 | 0.0004 | 0.0010 | −0.004% |
| 409 | 0.0004 | 0.0011 | −0.004% |
| 41 | 0.0004 | 0.0013 | −0.005% |
| 411 | 0.0005 | 0.0014 | −0.005% |
| 412 | 0.0006 | 0.0016 | −0.006% |
| 413 | 0.0006 | 0.0018 | −0.007% |
| 414 | 0.0007 | 0.0020 | −0.007% |
| 41 | 0.0008 | 0.0022 | −0.008% |
| 416 | 0.0009 | 0.0025 | −0.009% |
| 417 | 0.0010 | 0.0028 | −0.010% |
| 418 | 0.0011 | 0.0032 | −0.012% |
| 419 | 0.0012 | 0.0036 | −0.013% |
| 420 | 0.0014 | 0.0040 | −0.015% |
| 421 | 0.0016 | 0.0045 | −0.017% |
| 422 | 0.0018 | 0.0051 | −0.019% |
| 423 | 0.0020 | 0.0058 | −0.022% |

TABLE 1-1-continued

| Transmittance cut-off wavelength (Unit: nm) | Wx increase | Wy increase | Cut-off wavelength decreases in transmittance |
|---|---|---|---|
| 424 | 0.0023 | 0.0065 | −0.025% |
| 425 | 0.0025 | 0.0072 | −0.028% |
| 426 | 0.0028 | 0.0081 | −0.032% |
| 427 | 0.0032 | 0.0090 | −0.036% |
| 428 | 0.0035 | 0.0100 | −0.041% |
| 429 | 0.0039 | 0.0110 | −0.046% |
| 430 | 0.0043 | 0.0121 | −0.052% |
| 431 | 0.0047 | 0.0133 | −0.058% |
| 432 | 0.0052 | 0.0146 | −0.065% |
| 433 | 0.0057 | 0.0160 | −0.072% |
| 434 | 0.0062 | 0.0175 | −0.081% |
| 435 | 0.0068 | 0.0191 | −0.091% |
| 436 | 0.0074 | 0.0207 | −0.101% |
| 437 | 0.0081 | 0.0225 | −0.113% |
| 438 | 0.0088 | 0.0244 | −0.126% |
| 439 | 0.0095 | 0.0264 | −0.140% |
| 440 | 0.0103 | 0.0285 | −0.155% |
| 441 | 0.0112 | 0.0307 | −0.172% |
| 442 | 0.0121 | 0.0331 | −0.191% |
| 443 | 0.0130 | 0.0355 | −0.211% |
| 444 | 0.0140 | 0.0381 | −0.233% |
| 445 | 0.0150 | 0.0407 | −0.256% |
| 446 | 0.0161 | 0.0435 | −0.282% |
| 447 | 0.0172 | 0.0464 | −0.309% |
| 448 | 0.0184 | 0.0494 | −0.339% |
| 449 | 0.0196 | 0.0525 | −0.370% |
| 450 | 0.0209 | 0.0556 | −0.404% |
| 450 | 0.0209 | 0.0556 | −0.404% |

Step S14: analyzing the chromaticity variable information corresponding to the different wavelength ranges, and generating a relationship between the different wavelength ranges and the corresponding chromaticity variable information.

Specifically, after generating the chromaticity variable information corresponding to the different wavelength ranges according to step S13, analyze the chromaticity variable information corresponding to the different wavelength ranges, and generate a relationship between the different wavelength ranges and the corresponding chromaticity variable information. Since the chromaticity information mainly includes the first chromaticity Wx and the second chromaticity Wy, the relationship between the different wavelength ranges and the corresponding chromaticity variable information is a relationship between the different wavelengths and a first chromaticity variable Δx of the first chromaticity Wx, and a relationship between the different wavelengths and a second chromaticity variable Δy of the second chromaticity Wy.

Figure 4:
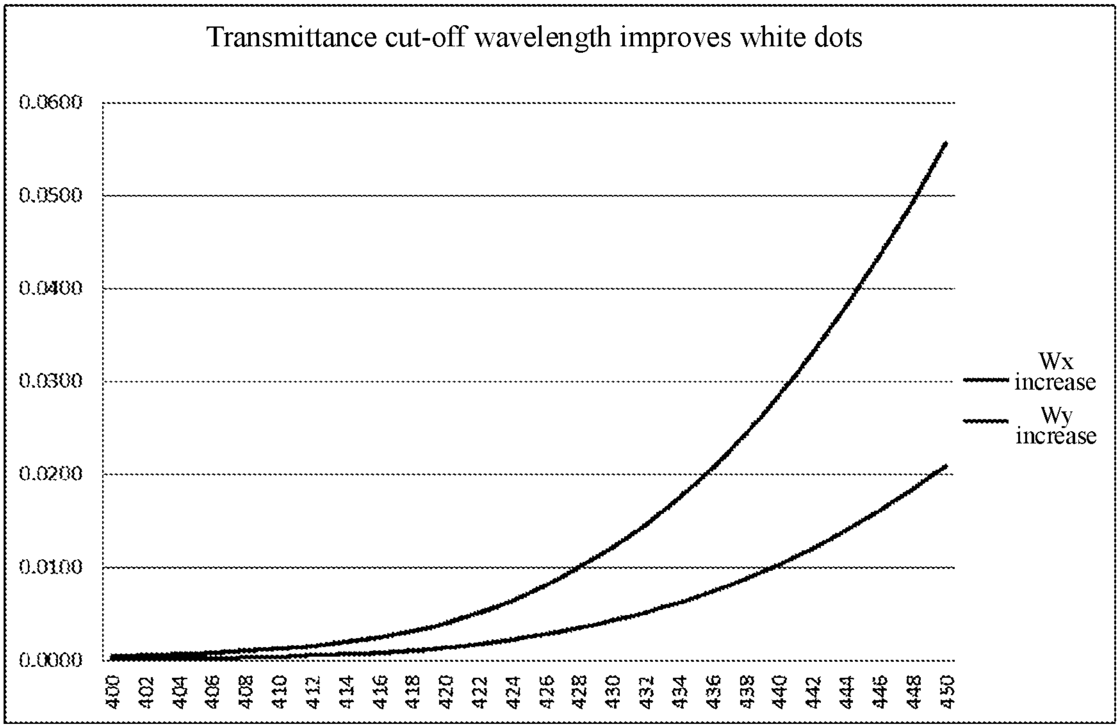
FIG. 4 is a relationship diagram between a wavelength range of 400 nanometers (nm) to 450 nm and corresponding chromaticity variable information in an embodiment of the present application.

In this embodiment, the method further includes obtaining a transmittance cut-off wavelength sample of the display screen; generating, by preprocessing the transmittance cut-off wavelength sample, transmittance cut-off wavelength samples in different wavelength ranges; absorbing energy of the transmittance cut-off wavelength sample in each of the wavelength ranges successively, and recording chromaticity variable information corresponding to the different wavelength ranges after absorbing the energy; and analyzing the chromaticity variable information corresponding to the different wavelength ranges, and generating a relationship between the different wavelength ranges and the corresponding chromaticity variable information. In this way, the relationship between the different transmittance cutoff wavelengths and the corresponding chromaticity variable information can be accurately generated, thereby ensuring that the chromaticity information (for example: the first chromaticity Wx and the second chromaticity Wy) can be increased more efficiently and accurately and reducing the proportion of the blue light, so as to achieve the purpose of eliminating the abnormal color area in the display screen. In one embodiment, as shown in FIG. 4, a relationship between the wavelength range of 400 nm to 450 nm and corresponding chromaticity variable information is provided.

Figure 5:
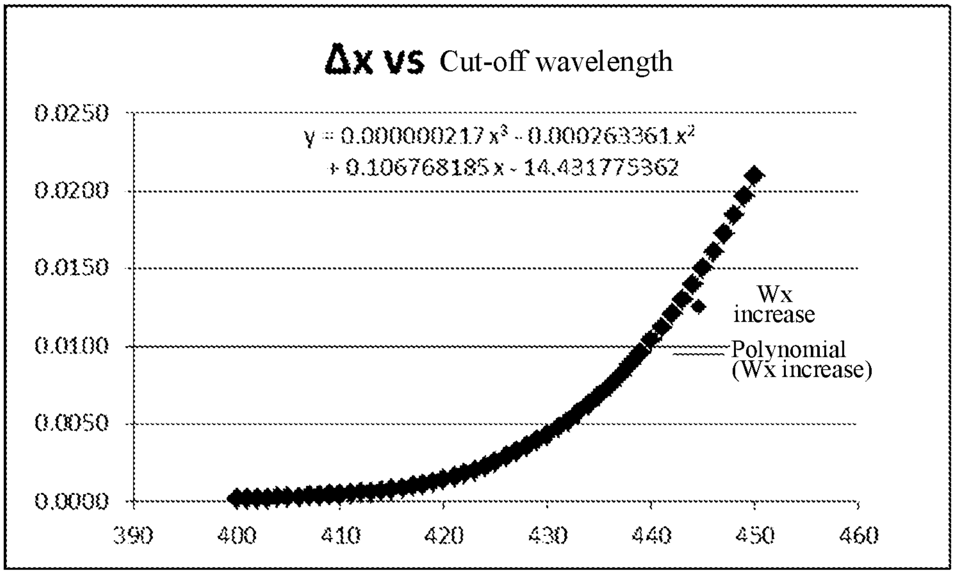
FIG. 5 is a relationship diagram between different wavelength ranges and corresponding first chromaticity variables in an embodiment of the present application.

In one embodiment, as shown in FIG. 5, the chromaticity variable information includes the first chromaticity variable Δx, and the relationship between the different wavelength ranges and the corresponding first chromaticity variable Δx is:

$$Y=0.000000217\Delta x3-0.000263361\Delta x2+0.106768185\Delta x-14.431775362,$$

wherein Y is a wavelength and Δx is the first chromaticity variable. It can be understood that the first chromaticity variable Δx is a transformation amount of the first chromaticity Wx after the energy of the wavelength in the corresponding range is absorbed. An improvement value of the first chromaticity Wx with different transmittance cut-off wavelengths can be calculated by the above formula.

Figure 6:
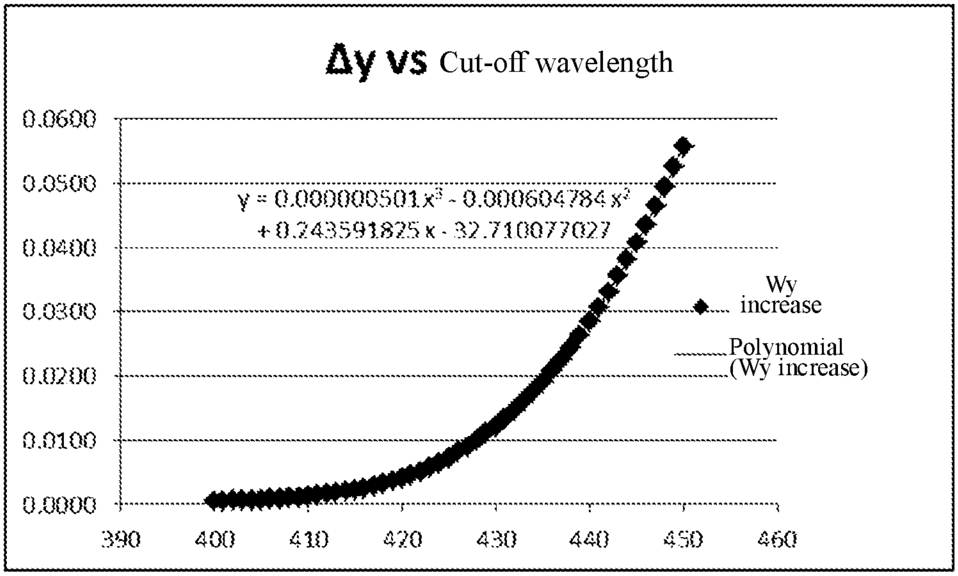
FIG. 6 is a relationship diagram between different wavelength ranges and corresponding second chromaticity variables in an embodiment of the present application.

In one embodiment, referring to FIG. 6, the chromaticity variable information includes the second chromaticity variable Δy, and the relationship between the different wavelength ranges and the corresponding second chromaticity variable Δy is:

$$Y=0.000000501\Delta y3-0.000604784\Delta y2+0.243591825\Delta y-32.710077027,$$

wherein Y is a wavelength and Δy is the second chromaticity variable. It can be understood that the second chromaticity variable Δy is a transformation amount of the second chromaticity Wy after the energy of the wavelength in the corresponding range is absorbed. An improvement value of the second chromaticity Wy with different transmittance cut-off wavelengths can be calculated by the above formula. Further, as a preferred embodiment, by taking the second chromaticity variable Δy to improve by 0.005 as an interval, a corresponding preferred transmittance cut-off wavelength is shown in Table 1-2 below:

TABLE 1-2

| Transmittance cut-off wavelength (Unit: nm) | Fluctuation (Unit: nm) | Minimum wavelength | Maximum wavelength | Δx | Δy |
|---|---|---|---|---|---|
| 422 | ±3 | 419 | 425 | 0.002 | 0.005 |
| 428 | ±3 | 425 | 431 | 0.004 | 0.010 |
| 432 | ±3 | 429 | 435 | 0.005 | 0.015 |
| 436 | ±2 | 434 | 438 | 0.007 | 0.021 |
| 438 | ±2 | 436 | 440 | 0.009 | 0.024 |
| 441 | ±2 | 439 | 443 | 0.011 | 0.031 |
| 443 | ±1 | 442 | 444 | 0.013 | 0.036 |
| 445 | ±1 | 444 | 446 | 0.015 | 0.041 |
| 447 | ±1 | 446 | 448 | 0.017 | 0.046 |
| 449 | ±1 | 448 | 450 | 0.020 | 0.052 |
| 450 | ±1 | 449 | 451 | 0.021 | 0.056 |

In this embodiment, in order to increase the first chromaticity Wx and the second chromaticity Wy to improve the chromaticity information of the display screen and eliminate the abnormal color area in the display screen, a transmittance cut-off wavelength range is preferably of 400 nm to 450 nm.

Figure 7:
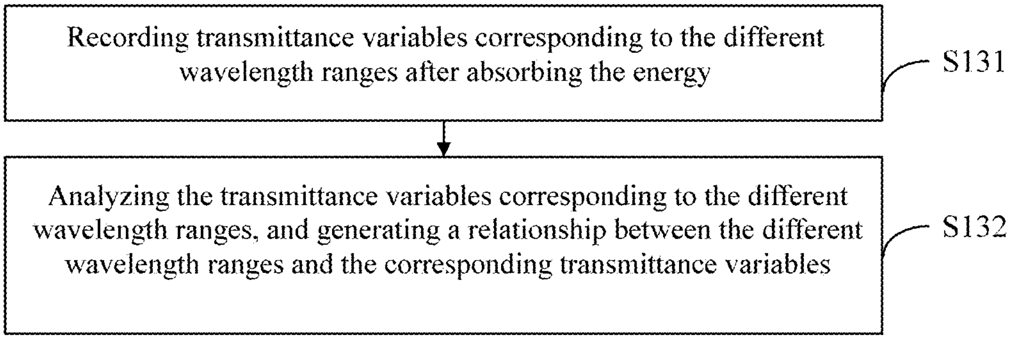
FIG. 7 is a flowchart of a method of adjusting a display screen in an embodiment of the present application.

In one embodiment, as shown in FIG. 7, after the step of absorbing the energy of the transmittance cut-off wavelength sample in each of the wavelength ranges successively, the method of adjusting the display screen further includes:

Step S131: recording transmittance variables corresponding to the different wavelength ranges after absorbing the energy.

Step S132: analyzing the transmittance variables corresponding to the different wavelength ranges, and generating a relationship between the different wavelength ranges and the corresponding transmittance variables.

In order to reduce the proportion of blue light while ensuring that the transmittance will not be reduced too much, after determining a relationship between a same wavelength range and corresponding transmittance variables, it also needs to analyze the relationship between different wavelength ranges and the corresponding transmittance variables. In one example, referring to FIG. 8, a relationship between the wavelength range of 400 nm to 450 nm and the corresponding transmittance variables is provided.

Figure 8:
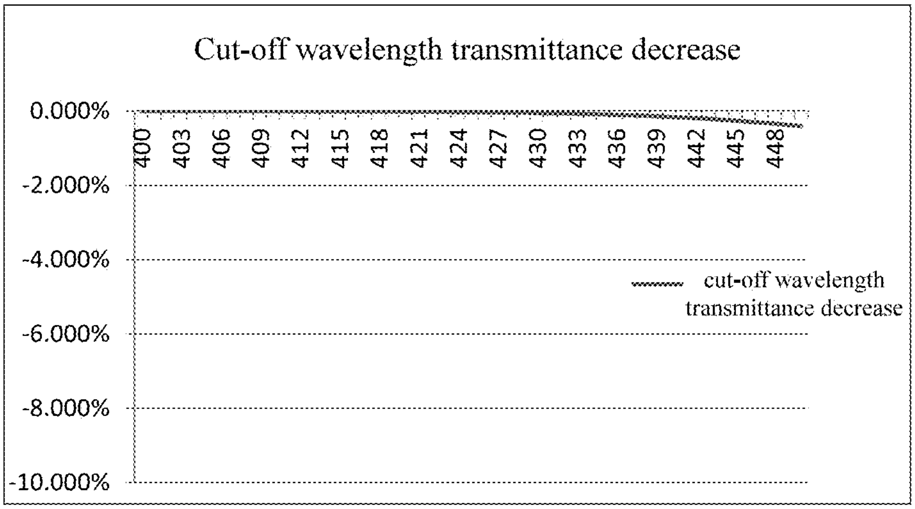
FIG. 8 is a relationship diagram between the wavelength range of 400 nm-450 nm and corresponding transmittance variables in the embodiment of the application.

It can be seen from FIG. 8 that the selection of the transmittance cut-off wavelength of 400 nm to 450 nm in this invention has a very low impact on the transmittance, within 1%.

Figure 9:
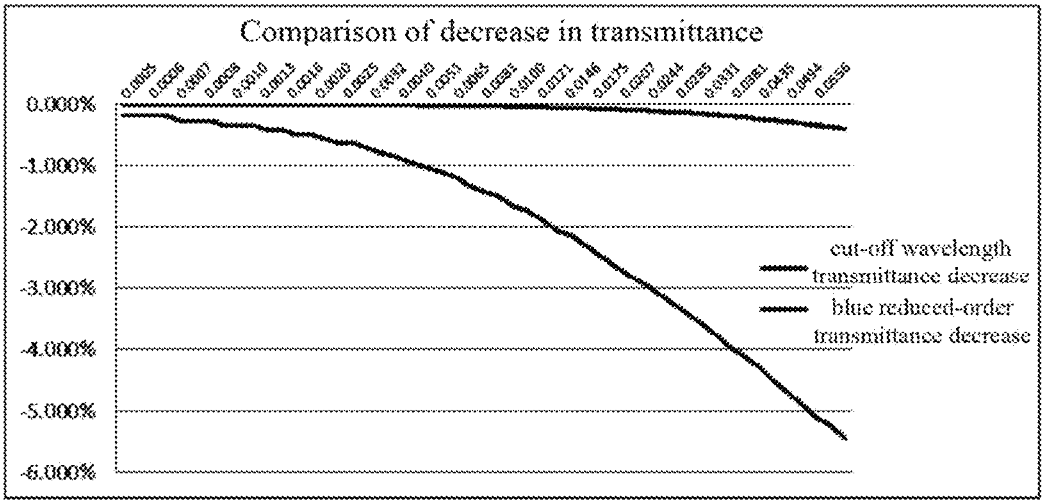
FIG. 9 is a relationship diagram showing a difference in influence of chromaticity increase on cut-off wavelength transmittance in an embodiment of the present application.
Figure 10:
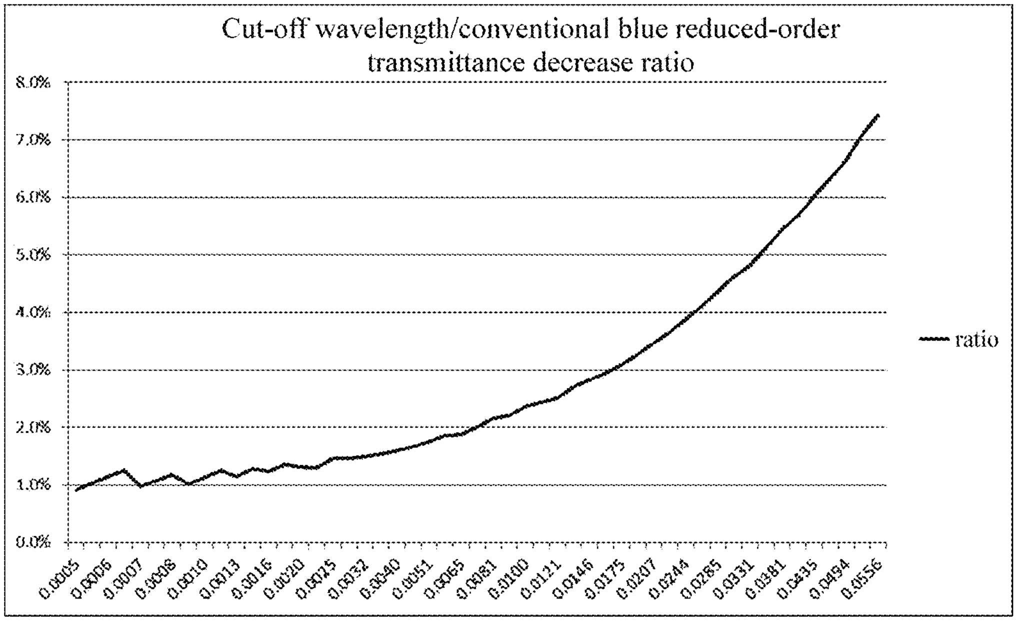
FIG. 10 is a relationship diagram showing a ration of a transmittance cut-off wavelength to conventional blue reduced-order in transmittance decrease in an embodiment of the present application.

Referring to FIG. 9, the cut-off wavelength transmittance reduction in this embodiment is compared with a conventional solution to reduce transmittance with blue reduced-order. When comparing a same increase in the second chromaticity Wy, a difference in the impact on the transmittance cut-off wavelength is as follows:

It can be seen that a reduction range of the transmittance occurred when the first chromaticity Wx and the second chromaticity Wy are improved by the short-wavelength transmittance cut-off wavelength in this application, compared with a transmittance reduction range of the first chromaticity Wx and the second chromaticity Wy improved by a conventional blue reduced-order, is significantly reduced, and a specific reduction range is shown in FIG. 10. It can be seen that the reduction range of the transmittance occurred when the first chromaticity Wx and the second chromaticity Wy are improved by the short-wavelength transmittance cut-off wavelength in this application is less than one tenth of the reduction range of the transmittance occurred when the first chromaticity Wx and the second chromaticity Wy are improved by the conventional blue reduced-order.

In one embodiment, after the step of absorbing the energy of the transmittance cut-off wavelength sample in each of the wavelength ranges successively, the method of adjusting the display screen further includes:

determining the predetermined wavelength threshold based on the relationship between the different wavelength ranges and the corresponding chromaticity variables and the relationship between the different wavelength ranges and the corresponding transmittance variables.

In one embodiment, after determining the relationship between the different wavelength ranges and the corresponding chromaticity variables and the relationship between the different wavelength ranges and the corresponding transmittance variables, it can be determined that the selection of the transmittance cut-off wavelength of 400 nm to 450 nm has a lowest impact, within 1%, on the transmittance, based on the relationship between the different wavelength ranges and the corresponding chromaticity variables and the relationship between the different wavelength ranges and the corresponding transmittance variables. Furthermore, based on the wavelength range corresponding to blue (B) is about 400 nm to 500 nm, and the median wavelength of blue (B) is 455 nm, therefore, in this embodiment, the predetermined wavelength threshold is preferably 455 nm.

It should be understood that although the various steps in the flowcharts of FIGS. 2, 3, and 7 are shown in sequence as indicated by arrows, the steps are not necessarily performed sequentially in the order indicated by the arrows. Unless explicitly stated herein, the execution of these steps is not strictly limited to the order, and the steps may be executed in other orders. In addition, at least some of the steps in FIGS. 2, 3, and 7 may include multiple sub-steps or multiple stages. These sub-steps or stages are not necessarily executed at a same time, but can be executed at different times. The order of execution of these sub-steps or phases is also not necessarily sequential, but may be performed in turn or alternately with other steps or at least a portion of the sub-steps or phases of other steps.

Figure 11:
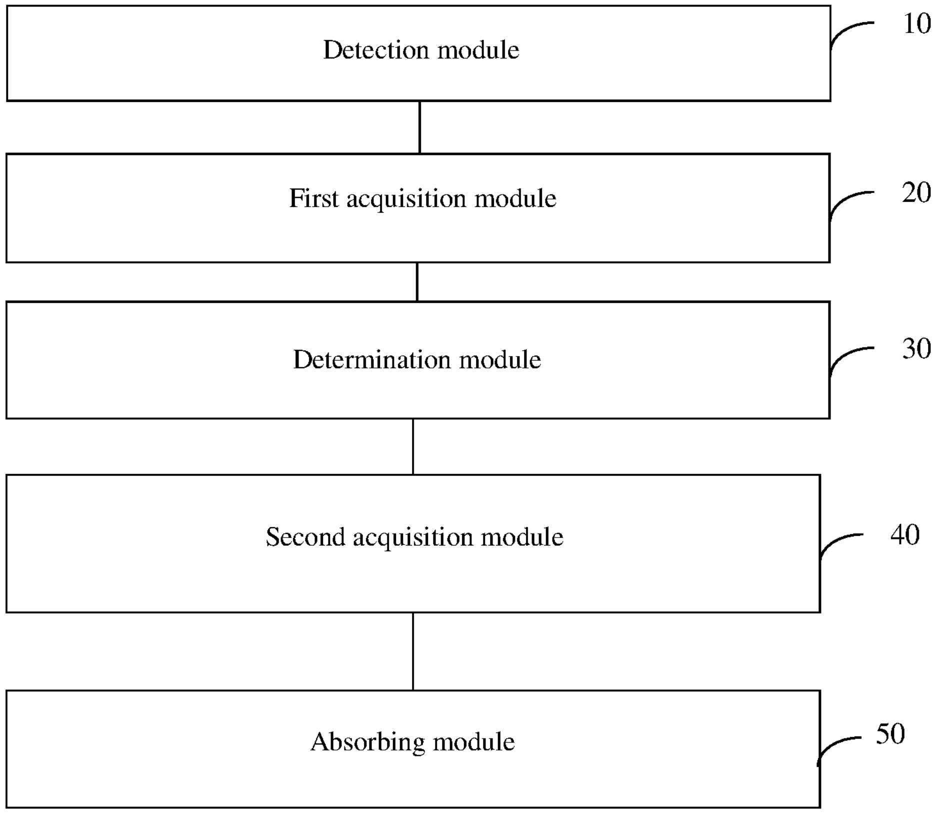
FIG. 11 is a schematic structural diagram of an adjusting device for a display screen in an embodiment of the present application.

In one embodiment, as shown in FIG. 11, an adjusting device for a display screen is provided and includes: a detection module 10, a first acquisition module 20, a determination module 30, a second acquisition module 40, and an absorbing module 50.

Specifically, the detection module 10 is configured to detect whether an abnormal brightness area is in a current display screen;

the first acquisition module 20 is configure to obtain, in response to detecting that the abnormal brightness area is in the current display screen, brightness information in the abnormal brightness area;

the determination module 30 is configured to determine whether an abnormal color in the abnormal brightness area is blue according to the brightness information;

the second acquisition module 40 is configured to obtain, in response to determining that the abnormal color in the abnormal brightness area is blue, a corresponding transmittance cut-off wavelength sequence in an abnormal color area in the abnormal brightness area; and the absorbing module 50 is configured to absorb wavelength energy whose wavelength is less than a predetermined wavelength threshold in the transmittance cut-off wavelength sequence, so that the abnormal color area in the display screen is eliminated.

Figure 12:
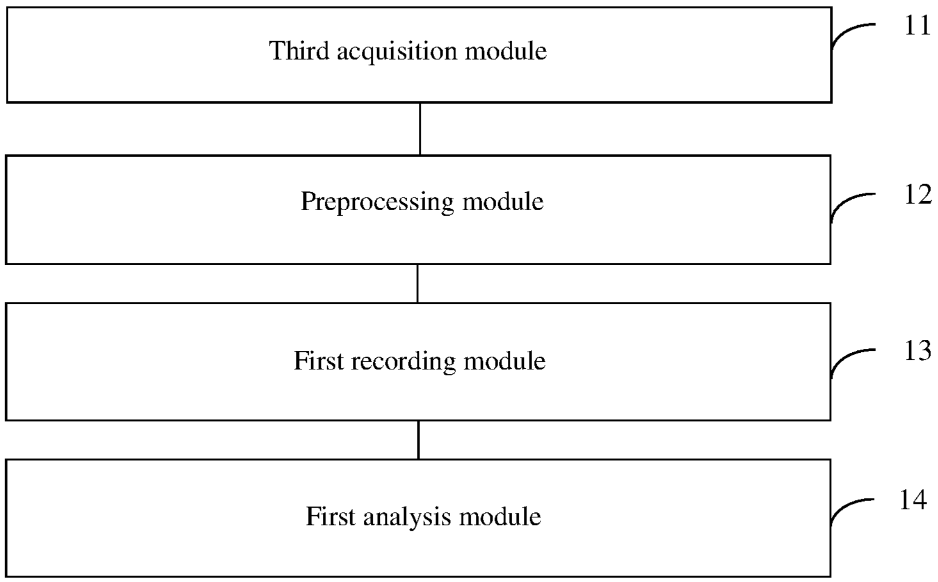
FIG. 12 is a schematic structural diagram of an adjusting device for a display screen in an embodiment of the present application.

Further, as shown in FIG. 12, the adjusting device for the display screen further includes:

a third acquisition module 11 configured to obtain a transmittance cut-off wavelength sample of the display screen;

a preprocessing module 12 configured to generate, by preprocessing the transmittance cut-off wavelength sample, transmittance cut-off wavelength samples in different wavelength ranges;

a first recording module 13 configured to absorb energy of the transmittance cut-off wavelength sample in each of the wavelength ranges successively and record chromaticity variable information corresponding to the different wavelength ranges after absorbing the energy; and a first analysis module 14 configured to analyze the chromaticity variable information corresponding to the different wavelength ranges and generate a relationship between the different wavelength ranges and the corresponding chromaticity variable information.

In addition, the adjusting device for the display screen further includes:

a second recording module configured to record transmittance variables corresponding to the different wavelength ranges after absorbing the energy; and a second analysis module configured to analyze the transmittance variables corresponding to the different wavelength ranges, and generating a relationship between the different wavelength ranges and the corresponding transmittance variables.

For the specific limitation of an impedance matching adjustment device, reference may be made to the limitation on the adjusting method of the display screen above, which will not be repeated here. All or part of the modules in the adjusting device for adjusting the display screen can be implemented by software, hardware, and combinations thereof. The above modules can be embedded or separately provided in a processor of a display device in the form of hardware, or can be stored in a memory in the display device in the form of software, in order to facilitate the processor to call and execute the operations corresponding to the above modules.

Figure 13:
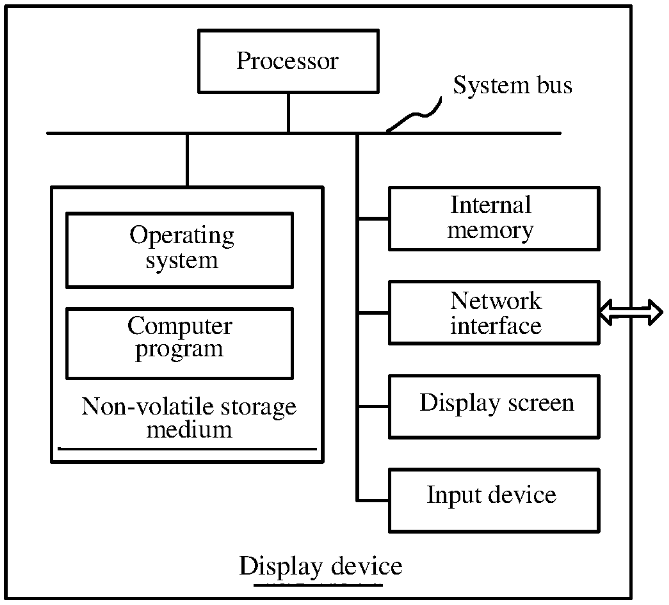
FIG. 13 is an internal structural diagram of a display device in an embodiment of the present application.

In one embodiment, a display device is provided, an internal structure of which may be as shown in FIG. 13. The display device includes a processor, a memory, a network interface, a display screen, and an input device that are connected through a system bus. Specifically, the processor of the display device is configured to provide computing and control capabilities. The memory of the display device includes a non-volatile storage medium and an internal memory. The non-volatile storage medium stores an operating system and a computer program. The internal memory provides an environment for the execution of the operating system and the computer program in the non-volatile storage medium. The network interface of the display device is configured to communicate with an external display device through a network connection. The computer program is executed by the processor to realize a method of adjusting a display screen. The display screen of the display device may be a liquid crystal display screen or an electronic ink display screen. The input device of the display device may be a touch layer covered on the display screen, or may be a button, a trackball, or a touchpad set on a casing of the display device, or can also be an external keyboard, trackpad, or mouse, etc.

Those skilled in the art can understand that the structure shown in FIG. 13 is only a block diagram of a part of the structure related to the solution of the present application, and does not constitute a limitation on the method of adjusting the display screen to which the solution of the present application is applied. A specific display device may include more or fewer components than shown in the figures, or combine certain components, or have a different arrangement of components.

In one embodiment, a display device, including a memory and a processor, is provided. The memory stores a computer program, and the processor implements the following steps when executing the computer program:

detecting whether an abnormal brightness area is in a current display screen;

obtaining, in response to detecting that the abnormal brightness area is in the current display screen, brightness information in the abnormal brightness area;

determining whether an abnormal color in the abnormal brightness area is blue according to the brightness information;

obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen.

In one embodiment, a computer-readable storage medium storing a computer program is further provided. The computer program stored in the computer-readable storage medium implements the following steps when being executed by the processor:

detecting whether an abnormal brightness area is in a current display screen;

obtaining, in response to detecting that the abnormal brightness area is in the current display screen, brightness information in the abnormal brightness area;

determining whether an abnormal color in the abnormal brightness area is blue according to the brightness information;

obtaining, in response to determining that the abnormal color in the abnormal brightness area is blue, a corresponding transmittance cut-off wavelength sequence in an abnormal color area in the abnormal brightness area; and eliminating, by absorbing wavelength energy whose wavelength is less than a predetermined wavelength threshold in the transmittance cut-off wavelength sequence, the abnormal color area in the display screen.

Those of ordinary skill in the art can understand that all or part of the processes in the methods of the above embodiments can be implemented by instructing relevant hardware through a computer program. The computer program can be stored in a non-volatile computer-readable storage medium. When the computer program is executed, it may include the processes of the above-mentioned method embodiments. Specifically, any reference to a memory, storage, database, or other medium used in the various embodiments provided herein may include non-volatile and/or volatile memories. Nonvolatile memories may include read only memories (ROMs), programmable ROMs (PROMs), electrically programmable ROMs (EPROMs), electrically erasable programmable ROMs (EEPROMs), or flash memories. Volatile memories may include random access memories (RAMs) or external cache memories. By way of illustration and not limitation, RAMs are available in various forms such as static RAMs (SRAMs), dynamic RAMs (DRAMs), synchronous DRAMs (SDRAMs), double data rate SDRAMs (DDRSDRAMs), enhanced SDRAMs (ESDRAMs), synchronous chain Road (Synchlink) DRAMs (SLDRAMs), memory bus (Rambus) direct RAMs (RDRAMs), direct memory bus dynamic RAMs (DRDRAMs), and memory bus dynamic RAM (RDRAMs), etc.

The technical features of the above embodiments can be combined arbitrarily. In order to simplify the description, all possible combinations of the technical features in the above embodiments are not described. However, as long as there is no contradiction in the combination of these technical features, they should be considered to be within the scope of the description in this specification.

The above-mentioned embodiments only represent several embodiments of the present application, and the descriptions thereof are relatively specific and detailed, but should not be construed as limiting the scope of the patent application. It should be noted that, for those skilled in the art, without departing from the concept of the present application, several modifications and improvements can be made, which all belong to the protection scope of the present application. Therefore, the scope of protection of the patent of the present application shall be subject to the appended claims.

What is claimed is:

1. A method of adjusting a display screen, applied to a display device, the method comprising:

detecting whether an abnormal brightness area is in a current display screen;

obtaining, in response to detecting that the abnormal brightness area is in the current display screen, brightness information in the abnormal brightness area;

determining whether an abnormal color in the abnormal brightness area is blue according to the brightness information;

obtaining, in response to determining that the abnormal color in the abnormal brightness area is blue, a corresponding transmittance cut-off wavelength sequence in an abnormal color area in the abnormal brightness area;

obtaining a transmittance cut-off wavelength sample of the display screen;

generating, by preprocessing the transmittance cut-off wavelength sample, transmittance cut-off wavelength samples in different wavelength ranges;

absorbing energy of the transmittance cut-off wavelength sample in each of the wavelength ranges successively, and recording chromaticity variable information corresponding to the different wavelength ranges after absorbing the energy;

analyzing the chromaticity variable information corresponding to the different wavelength ranges, and generating a relationship between the different wavelength ranges and the corresponding chromaticity variable information; and eliminating, by absorbing wavelength energy whose wavelength is less than a predetermined wavelength threshold in the transmittance cut-off wavelength sequence, the abnormal color area in the display screen.

2. The method of adjusting the display screen of claim 1, wherein the chromaticity variable information comprises a first chromaticity variable Δx, and a relationship between the different wavelength ranges and the corresponding first chromaticity variable Δx is:

$$Y=0.000000217\Delta x3-0.000263361\Delta x2+0.106768185\Delta x-14.431775362,$$

wherein Y is a wavelength and Δx is the first chromaticity variable.

3. The method of adjusting the display screen of claim 1, wherein the chromaticity variable information comprises a second chromaticity variable Δy, and a relationship between the different wavelength ranges and the corresponding second chromaticity variable Δy is:

$$Y=0.000000501\Delta y3-0.000604784\Delta y2+0.243591825\Delta y-32.710077027,$$

wherein Y is a wavelength and Δy is the second chromaticity variable.

4. The method of adjusting the display screen of claim 1, wherein after absorbing the energy of the transmittance cut-off wavelength sample in each of the wavelength ranges successively, the method of adjusting the display screen further comprises:

recording transmittance variables corresponding to the different wavelength ranges after absorbing the energy; and analyzing the transmittance variables corresponding to the different wavelength ranges, and generating a relationship between the different wavelength ranges and the corresponding transmittance variables.

5. The method of adjusting the display screen of claim 4, wherein after generating the relationship between the different wavelength ranges and the corresponding transmittance variables, the method of adjusting the display screen further comprises:

determining the predetermined wavelength threshold based on the relationship between the different wavelength ranges and the corresponding chromaticity variables and the relationship between the different wavelength ranges and the corresponding transmittance variables.

6. An adjusting device for a display screen, comprising:

a detection module configured to detect whether an abnormal brightness area is in a current display screen;

a first acquisition module configured to obtain, in response to detecting that the abnormal brightness area is in the current display screen, brightness information in the abnormal brightness area;

a determination module configured to determine whether an abnormal color in the abnormal brightness area is blue according to the brightness information;

a second acquisition module configured to obtain, in response to determining that the abnormal color in the abnormal brightness area is blue, a corresponding transmittance cut-off wavelength sequence in an abnormal color area in the abnormal brightness area;

a third acquisition module configured to obtain a transmittance cut-off wavelength sample of the display screen;

a preprocessing module configured to generate, by preprocessing the transmittance cut-off wavelength sample, transmittance cut-off wavelength samples in different wavelength ranges;

a first recording module configured to absorb energy of the transmittance cut-off wavelength sample in each of the wavelength ranges successively and record chromaticity variable information corresponding to the different wavelength ranges after absorbing the energy;

a first analysis module configured to analyze the chromaticity variable information corresponding to the different wavelength ranges and generate a relationship between the different wavelength ranges and the corresponding chromaticity variable information; and an absorbing module configured to absorb wavelength energy whose wavelength is less than a predetermined wavelength threshold in the transmittance cut-off wavelength sequence, so that the abnormal color area in the display screen is eliminated.

7. A display device, comprising a memory and a processor, the memory storing a computer program, wherein the processor implements the following steps when executing the computer program:

detecting whether an abnormal brightness area is in a current display screen;

obtaining, in response to detecting that the abnormal brightness area is in the current display screen, brightness information in the abnormal brightness area;

determining whether an abnormal color in the abnormal brightness area is blue according to the brightness information;

obtaining, in response to determining that the abnormal color in the abnormal brightness area is blue, a corresponding transmittance cut-off wavelength sequence in an abnormal color area in the abnormal brightness area;

obtaining a transmittance cut-off wavelength sample of the display screen;

generating, by preprocessing the transmittance cut-off wavelength sample, transmittance cut-off wavelength samples in different wavelength ranges;

absorbing energy of the transmittance cut-off wavelength sample in each of the wavelength ranges successively, and recording chromaticity variable information corresponding to the different wavelength ranges after absorbing the energy;

analyzing the chromaticity variable information corresponding to the different wavelength ranges, and generating a relationship between the different wavelength ranges and the corresponding chromaticity variable information; and eliminating, by absorbing wavelength energy whose wavelength is less than a predetermined wavelength threshold in the transmittance cut-off wavelength sequence, the abnormal color area in the display screen.

8. The display device of claim 7, wherein the chromaticity variable information comprises a first chromaticity variable Δx, and a relationship between the different wavelength ranges and the corresponding first chromaticity variable Δx is:

$$Y=0.000000217\Delta x3-0.000263361\Delta x2+0.106768185\Delta x-14.431775362,$$

wherein Y is a wavelength and Δx is the first chromaticity variable.

9. The display device of claim 7, wherein the chromaticity variable information comprises a second chromaticity variable Δy, and a relationship between the different wavelength ranges and the corresponding second chromaticity variable Δy is:

$$Y=0.000000501\Delta y3-0.000604784\Delta y2+0.243591825\Delta y-32.710077027,$$

wherein Y is a wavelength and Δx is the second chromaticity variable.

10. The display device of claim 7, wherein after the processor implements absorbing the energy of the transmittance cut-off wavelength sample in each of the wavelength ranges successively, the processor further implements:

recording transmittance variables corresponding to the different wavelength ranges after absorbing the energy; and analyzing the transmittance variables corresponding to the different wavelength ranges, and generating a relationship between the different wavelength ranges and the corresponding transmittance variables.

11. The display device of claim 10, wherein after generating the relationship between the different wavelength ranges and the corresponding transmittance variables, the processor further implements:

determining the predetermined wavelength threshold based on the relationship between the different wavelength ranges and the corresponding chromaticity variables and the relationship between the different wavelength ranges and the corresponding transmittance variables.

* * * * *